(12) United States Patent
Yasukawa et al.

(10) Patent No.: US 9,338,326 B2
(45) Date of Patent: May 10, 2016

(54) IMAGE PROCESSING APPARATUS TO WHICH SECURITY POLICY IS APPLICABLE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Akari Yasukawa, Yokohama (JP); Naoki Tsuchitoi, Kawasaki (JP); Shota Shimizu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/496,532

(22) Filed: Sep. 25, 2014

(65) Prior Publication Data
US 2015/0092222 A1    Apr. 2, 2015

(30) Foreign Application Priority Data

Oct. 1, 2013 (JP) ................................. 2013-206276

(51) Int. Cl.
| | |
|---|---|
| G06K 15/00 | (2006.01) |
| H04N 1/44 | (2006.01) |
| H04L 29/06 | (2006.01) |
| G06F 21/60 | (2013.01) |

(52) U.S. Cl.
CPC ............... *H04N 1/44* (2013.01); *G06F 21/608* (2013.01); *H04L 63/205* (2013.01)

(58) Field of Classification Search
CPC ................................ H04N 1/44; H04L 63/205
USPC .......................................................... 358/1.14
See application file for complete search history.

(56) References Cited

U.S. PATENT DOCUMENTS

| | | | |
|---|---|---|---|
| 6,941,355 B1* | 9/2005 | Donaghey et al. | 709/220 |
| 2013/0063761 A1* | 3/2013 | Uchibori et al. | 358/1.14 |
| 2014/0108649 A1* | 4/2014 | Barton et al. | 709/224 |
| 2015/0046970 A1* | 2/2015 | Shimizu | 726/1 |

FOREIGN PATENT DOCUMENTS

| | | |
|---|---|---|
| JP | 2005-209070 A | 8/2005 |
| JP | 2008-219419 A | 9/2008 |

* cited by examiner

*Primary Examiner* — Marivelisse Santiago Cordero
*Assistant Examiner* — Neil R McLean
(74) *Attorney, Agent, or Firm* — Carter, DeLuca, Farrell & Schmidt, LLP

(57) ABSTRACT

An image processing apparatus that is capable of appropriately applying security policy data based on an information security policy. Security policy data containing a policy name of a security policy and a security policy setting value corresponding to the policy name is applied to the image processing apparatus. An obtaining unit obtains updating security policy data for updating the security policy data. An application version determination unit determines whether the updating security policy data obtained by the obtaining unit will be applied according to a predetermined application version setting value, when a version of the updating security policy data differs from a version of security policy data that is being applied actually. An application unit applies the updating security policy data when the application version determination unit determines that the updating security policy data will be applied.

18 Claims, 11 Drawing Sheets

FIG.3A

| POLICY VERSION | 2.0 |
|---|---|
| POLICY NAME | SECURITY POLICY SETTING VALUE |
| PERFORM ACQUISITION OF AUDIT LOG | VALID |
| PASSWORD COMPLEXITY | SAME CHARACTER IS NOT USED 3 TIMES CONTINUOUSLY |
| PROHIBIT TRANSFER OF RECEIVED JOB | INVALID |

FIG.3B

| POLICY VERSION | 1.0 |
|---|---|
| POLICY NAME | RANGE |
| PERFORM ACQUISITION OF AUDIT LOG | VALID/INVALID |
| PASSWORD COMPLEXITY | ONE OR MORE SYMBOL IS INCLUDED |
| | SAME CHARACTER IS NOT USED 3 TIMES CONTINUOUSLY |

FIG.3C

| POLICY VERSION | 2.0 |
|---|---|
| POLICY NAME | RANGE |
| PERFORM ACQUISITION OF AUDIT LOG | VALID/INVALID |
| PASSWORD COMPLEXITY | ONE OR MORE SYMBOL IS INCLUDED |
| | SAME CHARACTER IS NOT USED 3 TIMES CONTINUOUSLY |
| | USER NAME IS NOT USED AS PASSWORD |
| PROHIBIT TRANSFER OF RECEIVED JOB | VALID/INVALID |

FIG.3D

| POLICY NAME | CORRESPONDING USER MODE SETTING ITEM | USER MODE SETTING VALUE IN VALID CASE |
|---|---|---|
| PERFORM ACQUISITION OF AUDIT LOG | OBTAIN AUDIT LOG | ON |
| PASSWORD COMPLEXITY | USER AUTHENTICATION PASSWORD POLICY | ONE OR MORE SYMBOL IS INCLUDED: ON |
| | | SAME CHARACTER IS NOT USED 3 TIMES CONTINUOUSLY: ON |
| | | USER NAME IS NOT USED AS PASSWORD: ON |
| | FTP PRINT PASSWORD POLICY | ONE OR MORE SYMBOL IS INCLUDED: ON |
| | | SAME CHARACTER IS NOT USED 3 TIMES CONTINUOUSLY: ON |
| | | USER NAME IS NOT USED AS PASSWORD: ON |
| PROHIBIT TRANSFER OF RECEIVED JOB | TRANSFER SETTING | OFF |

- <POLICY VERSION> 2.0 ▼
- <PERFORM ACQUISITION OF AUDIT LOG> VALID | INVALID
- <PASSWORD COMPLEXITY>
  - ○ ONE OR MORE SYMBOL IS INCLUDED
  - ● SAME CHARACTER IS NOT USED 3 TIMES CONTINUOUSLY
  - ○ USER NAME IS NOT USED AS PASSWORD
- <PROHIBIT TRANSFER OF RECEIVED JOB> VALID | INVALID

506
[OK]  [CANCEL]

- <POLICY VERSION> 2.0 ▼
- <PERFORM ACQUISITION OF AUDIT LOG> <1.0> VALID | INVALID
- <PASSWORD COMPLEXITY>
  - <1.0> ○ ONE OR MORE SYMBOL IS INCLUDED
  - <1.0> ● SAME CHARACTER IS NOT USED 3 TIMES CONTINUOUSLY
  - <2.0> ○ USER NAME IS NOT USED AS PASSWORD
- <PROHIBIT TRANSFER OF RECEIVED JOB> <2.0> VALID | INVALID

1206
[OK]  [CANCEL]

| POLICY VERSION | 1.0 |
|---|---|
| POLICY NAME | SECURITY POLICY SETTING VALUE |
| PERFORM ACQUISITION OF AUDIT LOG | VALID |
| PASSWORD COMPLEXITY | SAME CHARACTER IS NOT USED 3 TIMES CONTINUOUSLY |

FIG. 7C

| POLICY VERSION | 3.0 |
|---|---|
| POLICY NAME | SECURITY POLICY SETTING VALUE |
| PERFORM ACQUISITION OF AUDIT LOG | VALID |
| PASSWORD COMPLEXITY | SAME CHARACTER IS NOT USED 3 TIMES CONTINUOUSLY |
| | USER NAME IS NOT USED AS PASSWORD |
| PROHIBIT TRANSFER OF RECEIVED JOB | INVALID |
| ELIMINATE RESIDUAL DATA | VALID |

FIG. 7D

| POLICY VERSION | 3.0 |
|---|---|
| POLICY NAME | SECURITY POLICY SETTING VALUE |
| PERFORM ACQUISITION OF AUDIT LOG | VALID |
| PASSWORD COMPLEXITY | SAME CHARACTER IS NOT USED 3 TIMES CONTINUOUSLY |
| | USER NAME IS NOT USED AS PASSWORD |
| PROHIBIT TRANSFER OF RECEIVED JOB | INVALID |
| ELIMINATE RESIDUAL DATA | INVALID |

IMAGE PROCESSING APPARATUS TO WHICH SECURITY POLICY IS APPLICABLE, CONTROL METHOD THEREFOR, AND STORAGE MEDIUM STORING CONTROL PROGRAM THEREFOR

BACKGROUND OF THE INVENTION

1. Field of the Invention

The present invention relates to an image processing apparatus to which a security policy is applicable, a control method therefor, and a storage medium storing a control program therefor.

2. Description of the Related Art

A personal computer (PC) and server machines, such as a file server and an authentication server, which are connected to a network of an office, are preferable to be operated according to an information security policy determined for the office.

An information security policy is a basic policy of an information security of the entire company, and is what summarized a policy of use of information, a policy for preventing invasion from the outside, and a policy for preventing information leak. An information security policy is established by an administrator who treats security.

A peripheral apparatus, such as an image processing apparatus, in addition to a PC and a server device may be connected to an office network. An image processing apparatus in recent years does not only print or transmit an image, but also stores image data, provides a file service function to a PC, and it plays increasingly the same role as another server machine located on a network.

Moreover, since an application development environment of an image processing apparatus is opened in recent years like an environment of a PC, an application developed by a third party is available.

In order to maintain a safe and secure office environment, an image processing apparatus is required to follow an information security policy in the same manner as a PC or a server machine. Following an information security policy here means that a restriction on security is established in practical use of an image processing apparatus in order to prevent unauthorized use and information leak of the image processing apparatus in an office. For example, user authentication is required when a user operates an image processing apparatus.

In a field of a PC and a server machine, there is a method that setting values, which are dependent on an OS for example, are collectively set by a distribution server and that the setting values are distributed to a PC and a server machine, in order to make them follow an information security policy.

A setting value of "non-SSL connection is permitted" is an example of a setting value that is dependent on an OS. Such a setting value is systematically managed so that a PC of any vender follows the information security policy defined by the setting value.

In a field of an image processing apparatus, since available settings about security are different for each image processing apparatus, a setting value that is dependent on an OS cannot be distributed as-is like a PC or a server machine.

Accordingly, there is a proposed system that sets security to an apparatus according to an information security policy based on a rule established for each apparatus (for example, see Japanese Laid-Open Patent Publication (Kokai) No. 2008-219419 (JP 2008-219419A)).

Since such an information security policy is revised by daily operation, an administrator needs to update an information security policy and needs to set it to a PC or a server machine again.

There is a proposed system in which a PC or a server machine searches a distribution server, and receives and sets an updated information security policy when it is available (for example, see Japanese Laid-Open Patent Publication (Kokai) No. 2005-209070 (JP 2005-209070A)).

The information security policy is updated when a setting value is changed or a new information security policy is added.

The latter case needs to introduce a device corresponding to the new information security policy or to upgrade an existing device so as to correspond in order to reflect the new information security policy to a device.

Accordingly, it is difficult to make all the devices correspond to the new information security policy simultaneously at the time when the policy is updated.

When the updated information security policy is automatically applied to devices using the conventional technique, devices to which the information security policy is reflected and devices to which the policy is not reflected are intermingled, which complicates an administrator's determination of whether the information security policy has been reflected to each device.

SUMMARY OF THE INVENTION

The present invention provides an image processing apparatus, a control method therefor, and a storage medium storing a control program therefor, which are capable of appropriately applying security policy data based on an information security policy.

Accordingly, a first aspect of the present invention provides an image processing apparatus to which security policy data containing a policy name of a security policy and a security policy setting value corresponding to the policy name is applied, comprising an obtaining unit configured to obtain updating security policy data for updating the security policy data, an application version determination unit configured to determine whether the updating security policy data obtained by the obtaining unit will be applied according to a predetermined application version setting value, when a version of the updating security policy data differs from a version of security policy data that is being applied actually, and an application unit configured to apply the updating security policy data when the application version determination unit determines that the updating security policy data will be applied.

Accordingly, a second aspect of the present invention provides a control method for an image processing apparatus to which security policy data containing a policy name of a security policy and a security policy setting value corresponding to the policy name is applied, the control method comprising an obtaining step of obtaining updating security policy data for updating the security policy data, an application version determination step of determining whether the updating security policy data obtained in the obtaining step will be applied according to a predetermined application version setting value, when a version of the updating security policy data differs from a version of security policy data that is being applied actually, and an application step of applying the updating security policy data when it is determined that the updating security policy data will be applied in the application version determination step.

Accordingly, a third aspect of the present invention provides a non-transitory computer-readable storage medium storing a control program causing a computer to execute the control method of the second aspect.

According to the present invention, when the version of the updating security policy data is different from the versions of the security policy data that is being applied actually, it is determined whether the updating security policy data is applied on the basis of the predetermined application version setting value. And when it is determined that the updating security policy data is applied, the updating security policy data is applied. Accordingly, the security policy data based on the information security policy is applicable appropriately.

Further features of the present invention will become apparent from the following description of exemplary embodiments with reference to the attached drawings.

BRIEF DESCRIPTION OF THE DRAWINGS

FIG. 3A is a view showing an example of security policy data used in the information processing system shown in FIG. 1.

FIG. 3B and FIG. 3C are views showing examples of security policy management data used in the information processing system shown in FIG. 1.

FIG. 3D is a view showing an example of a conversion rule file used in the image processing apparatus shown in FIG. 1.

FIG. 4A and FIG. 4B are views showing screen examples displayed on a UI operation unit of the image processing apparatus shown in FIG. 1.

FIG. 7A is a view showing an example of a policy management setting screen displayed on the UI operation unit of the image processing apparatus shown in FIG. 1.

FIG. 7B, FIG. 7C, and FIG. 7D are the views showing the example of a security policy data applied to the image processing apparatus in FIG. 1.

DESCRIPTION OF THE EMBODIMENTS

Hereafter, embodiments according to the present invention will be described in detail with reference to the drawings.

Figure 1:
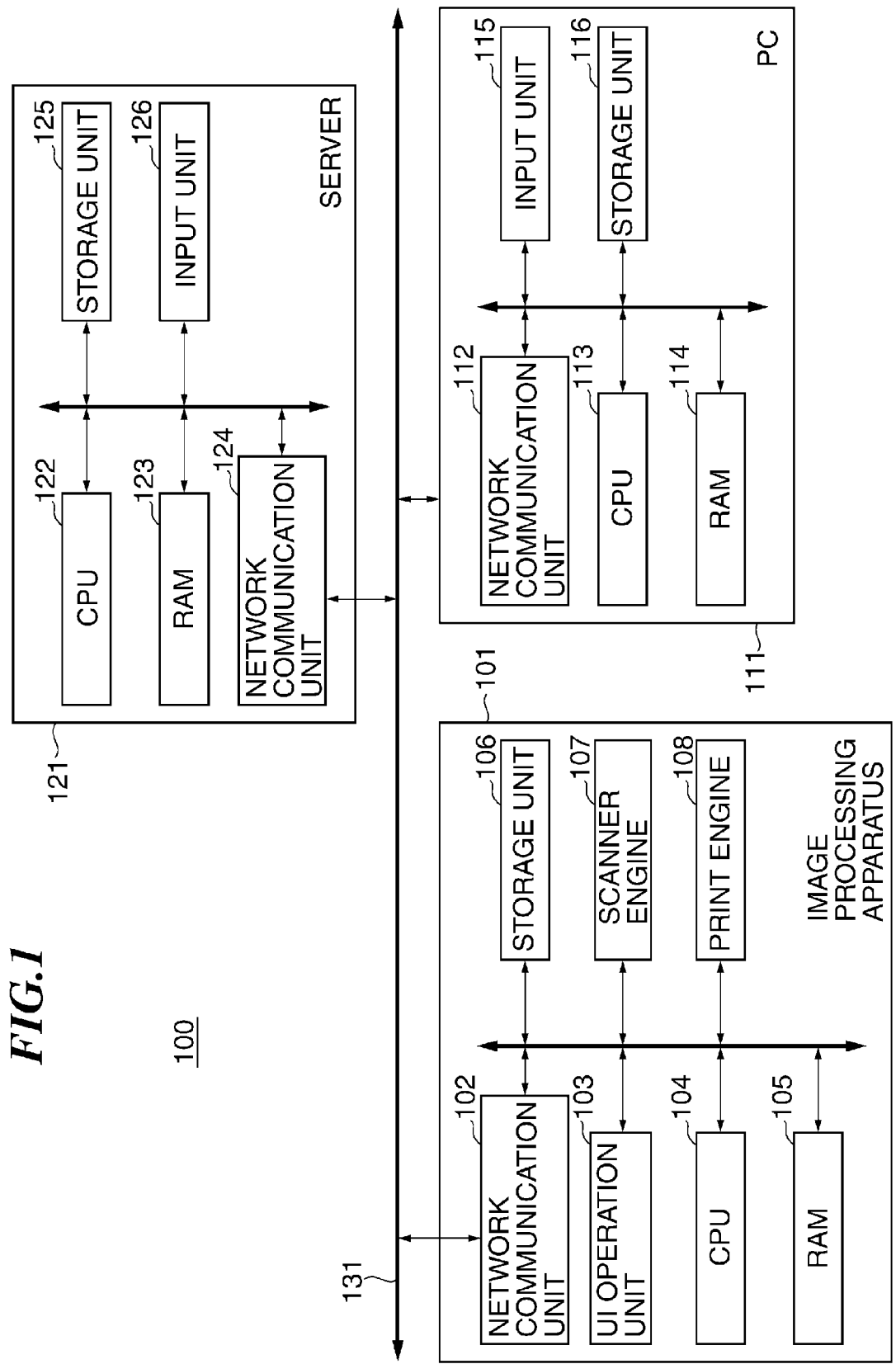
FIG. 1 is a view schematically showing a configuration of an information processing system including an image processing apparatus according to an embodiment of the present invention, a server, and a PC.

FIG. 1 is a view schematically showing a configuration of an information processing system 100 including an image processing apparatus 101 according to an embodiment of the present invention, a server 121, and a PC 111.

As shown in FIG. 1, the image processing apparatus 101, the server 121, and the PC 111 are connected via a network 131 and communicate mutually. FIG. 1 shows an example of an information processing system. Types and the number of apparatuses connected to the network are not restricted to the configuration shown in FIG. 1.

The image processing apparatus 101, the PC 111, and the server 121 in this information processing system 100 are operated and managed according to an information security policy. Here, an information security policy means a policy about information security defined by documents, such as company regulations.

Moreover, an information security policy (referred to as a "security policy", hereafter) includes items, which are expressed as security policy items. A setting value (referred to as a "security policy setting value", hereafter) is defined for each security policy item according to the security policy.

The server 121 is used to manage the security policy unified with the information processing system 100, and a security policy setting value that an administrator set up on the server 121 is distributed to the image processing apparatus 101 and the PC 111 through the network 131.

Moreover, an administrator is able to individually set up a security policy item and its value of the image processing apparatus on the image processing apparatus 101. Hereinafter, each apparatus that constitutes the information processing system 100 will be described.

The image processing apparatus 101 consists of a network communication unit 102, a UI operation unit 103, a CPU 104, a RAM 105, a storage unit 106, a scanner engine 107, and a print engine 108.

The network communication unit 102 communicates with external devices, such as the PC 111, through the network 131. The UI operation unit 103, which corresponds to a display unit of the image processing apparatus 101, receives a setting of the image processing apparatus 101 by a user's operation, and displays a state of the image processing apparatus 101.

The CPU 104 controls the whole image processing apparatus 101. The RAM 105 stores temporarily program codes that the CPU 104 executes and information including image data etc. The storage unit 106 stores program codes, image data, and user information. Processes shown in flowcharts mentioned later are executed by the CPU 104 according to program codes read out from the storage unit 106 to the RAM 105.

The scanner engine 107 reads optically an image printed on a paper medium. The print engine 108 prints image data on a paper medium with a known technique, such as electrophotography and an ink jet technique.

The image processing apparatus 101 described above is provided with a reception transfer function that receives data sent from an external device and transmits it to another apparatus.

With this reception transfer function, when the network communication unit 102 receives data from an external device, such as the PC 111, through the network 131, the CPU 104 stores image data to the storage unit 106 according to the program code stored in the RAM 105.

The stored image data is transmitted from the network communication unit 102 to a destination designated beforehand, after performing predetermined format conversion. Protocols, such as IFAX, SMB, and FTP, are generally used for the reception and transmission of image data.

Furthermore, the image processing apparatus 101 is provided with a user authentication function. This user authentication function requires a user to input a user name and a password through the UI operation unit 103 in order to determine whether the user is authorized to use before providing a function of the image processing apparatus 101.

Moreover, the image processing apparatus 101 is able to perform an FTP (File Transfer Protocol) print. In this FTP print, the image processing apparatus 101 receives print data with the network communication unit 102 using FTP, and performs an authentication process by comparing the user name and password that have been registered for the FTP beforehand in the image processing apparatus 101 with the user name and password that are set in the received print data. Then, the image processing apparatus 101 prints the received print data using the print engine 108, only when they coincide.

The PC 111 consists of a network communication unit 112, a CPU 113, a RAM 114, an input unit 115, and a storage unit 116.

The network communication unit 112 communicates with external devices, such as the image processing apparatus 101, through the network 131. The CPU 113 controls the whole PC 111. The RAM 114 stores temporarily program codes that the CPU 113 executes.

The input unit 115 receives an input to the PC 111 by an administrator, and displays varieties of information, such as application screens. The storage unit 116 stores program codes and data.

The server 121 consists of a network communication unit 124, a CPU 122, a RAM 123, a storage unit 125, and an input unit 126.

The network communication unit 124 communicates with external devices, such as the PC 111, through the network 131. The CPU 122 controls the whole server 121. The RAM 123 stores temporarily information like program codes that the CPU 122 executes.

The storage unit 125 stores program codes and data. The input unit 126 receives an input to the server 121 by an administrator and displays information.

Figure 2A:
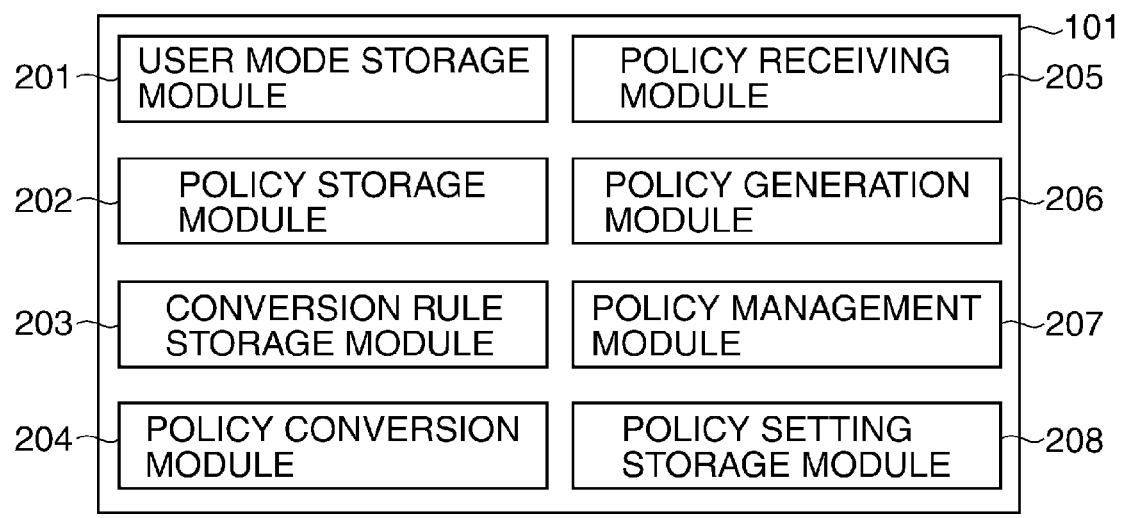
FIG. 2A is a view schematically showing a software configuration of the image processing apparatus shown in FIG. 1.

FIG. 2A is a view schematically showing a software configuration of the image processing apparatus 101 shown in FIG. 1.

As shown in FIG. 2A, the software of the image processing apparatus 101 consists of a user mode storage module 201, a policy storage module 202, a conversion rule storage module 203, a policy conversion module 204, a policy receiving module 205, a policy generation module 206, a policy management module 207, and a policy setting storage module 208.

The user mode storage module 201 stores names and values of setting items (referred to as "user mode setting items", hereafter) in connection with operations of the image processing apparatus 101 that were set up through the UI operation unit 103.

As examples of the user mode setting items, audit-log acquisition and a transfer setting are given. An audit log is a function that the image processing apparatus 101 stores its operation information to the storage unit 106 as an audit log, when a user uses a copy function or a reception transfer function of the image processing apparatus 101 or performs various settings to the image processing apparatus 101. Then, the audit-log acquisition is a user mode setting item that sets of whether an audit-log function is made effective.

Moreover, the transfer setting is a user mode setting item for setting up the transfer destination of the received data in the above-mentioned reception transfer function. This user mode setting item enables various settings to transfer data to a specific destination according to conditions, such as a source address and a receiving protocol. For example, it enables a setting to transfer received data from a specific source address to a specific destination. It should be noted that a name, a value, etc. of a user mode setting item are stored in the storage unit 106.

The policy storage module 202 stores security policy data generated and set by the image processing apparatus 101 and security policy data sent from the outside through the network communication unit 102 in the storage unit 106.

This security policy data consists of a policy name of a security policy setting item and a security policy setting value corresponding to it. Moreover, an example of the security policy setting value will be described later.

The conversion rule storage module 203 stores a conversion rule file that shows information required to compare the security policy setting value with a setting value of the current user mode setting item (referred to as a "user mode setting value", hereafter) of the image processing apparatus 101 to the storage unit 106. The details of the conversion rule file will be described later.

Moreover, a conversion rule file stored in an external device, such as the PC 111, may be received by the network communication unit 102.

The policy conversion module 204 compares a security policy setting value with a user mode setting value on the basis of the conversion rule file stored in the conversion rule storage module 203. As a result of the comparison, the user mode setting value to which the security policy setting value is applied is determined.

The policy receiving module 205 makes the policy storage module 202 store security policy data that is received by the network communication unit 102. The policy generation module 206 generates security policy data according to information that the administrator inputted through the UI operation unit 103. The security policy data generated in this way or the security policy data received from the server 121 becomes updating security policy data for updating the security policy data.

The policy management module 207 manages a version of security policy data (referred to as a "policy version") and security policy setting items that are configurable in each policy version as security policy management data. The security policy management data is stored in the storage unit 106. An example of this security policy management data will be described later.

The above-mentioned policy version is given in order to manage the security policy data by the image processing apparatus 101 and the server 121. The policy version is updated when the policy items that constitute the security policy data are changed or when a settable range of each policy item is changed.

There are a plurality of policy versions that are settable in the image processing apparatus 101. An administrator is able to select a policy version according to the security policy, and sets up a security policy setting value of a security policy setting item that is regulated by the selected policy version.

The policy setting storage module 208 stores a setting value, which shows whether setting of a setting item of a policy version that differs from the policy version applied to the image processing apparatus 101 is permitted, to the storage unit 106.

Besides the software described above, the image processing apparatus 101 is provided with a Send module as software that is not illustrated that converts image data that is obtained by controlling the scanner engine 107 to read an original optically into an electronic file and sends it to a designated destination.

Furthermore, the image processing apparatus 101 is provided with a print module that interprets a PDL code received from the PC 111 or other devices through the network and prints it.

Moreover, the image processing apparatus 101 is provided with a BOX module that accumulates image data in the storage unit 106, and a receiving module that receives image data by the network communication unit 102 and accumulates the image data in the storage unit 106.

Furthermore, the image processing apparatus 101 is provided with a Web browser module for reading and displaying information on various Web sites on the Internet or an intranet by the HTTP or HTTPS protocol.

Figure 2B:
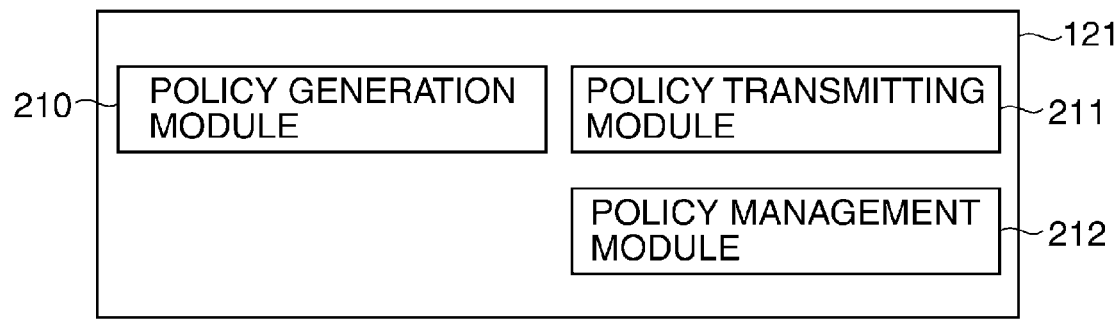
FIG. 2B is a view schematically showing a software configuration of the server shown in FIG. 1.

FIG. 2B is a view schematically showing a software configuration of the server 121 shown in FIG. 1.

As shown in FIG. 2B, the server 121 consists of a policy generation module 210, a policy transmitting module 211, and a policy management module 212.

The policy generation module 210 generates security policy data according to information that the administrator inputted. The policy transmitting module 211 distributes the security policy data generated by the policy generation module 210 from the network communication unit 124 through the network 131.

The policy management module 212 manages a policy version and security policy setting items that are settable in each policy version. The information managed here is the same as the security policy management data.

The policy management module 212 notifies other devices of a policy version and security policy setting items of security policy data to be generated, when an administrator generates the security policy data with the policy generation module 210.

FIG. 3A is a view showing an example of security policy data. FIG. 3B and FIG. 3C are views showing examples of security policy management data. FIG. 3D is a view showing an example of a conversion rule file.

As shown in FIG. 3A, the security policy data consists of a policy version, a policy name of a security policy item and a security policy setting value to it.

The security policy data in FIG. 3A shows the policy names of "Perform acquisition of audit log", "Password complexity", and "Prohibit transfer of received j.

Among these, the security policy setting item of which the policy name is "Password complexity" forces complexity of a password that should be satisfied about each password that is settable in the image processing apparatus 101. For example, it is settable to a password for the user authentication function.

Moreover, the security policy setting item of which the policy name is "Prohibit transfer of received job" is the item that sets about whether transfer of a job received by the image processing apparatus 101 to another device is prohibited.

As the security policy setting values of the respective security policy setting items mentioned above, "Valid", "Same character is not used 3 times continuously", and "Invalid" are set.

As shown in FIG. 3B and FIG. 3C, the security policy management data consists of a policy version, a policy name, and a range. Among these, the range limits the settable security policy setting value.

The policy version of the security policy management data shown in FIG. 3B is "1.0", and there are two policy names of "Perform acquisition of audit log" and "Password complexity".

It is shown that "Valid" or "Invalid" is settable as the security policy setting value for "Perform acquisition of audit log".

At least one of "One or more symbol is included" and "Same character is not used 3 times continuously" is settable as the security policy setting value for "Password complexity". When neither value is set, the security policy setting item becomes invalid.

The policy version of the security policy management data shown in FIG. 3C is "2.0", and the security policy setting item of which the policy name is "Prohibit transfer of received job" is added to the policy names of the security version "1.0". It is shown that "Valid" or "Invalid" is settable as the security policy setting value for "Prohibit transfer of received job".

Moreover, "User name is not used as password" is settable as the security policy setting value for "Password complexity" in addition to the security policy setting values settable in the policy version "1.0".

In this way, the security policy setting item is updated by the operational environment of the image processing apparatus. When the security policy setting item is updated, the policy version is also updated. It should be noted that only the case where the security policies of "Perform acquisition of audit log", "Password complexity", and "Prohibit transfer of received jobbing" exist is described in this embodiment in order to simply the description. Actually, more security policies may exist.

As shown in FIG. 3D, the conversion rule file consists of a policy name, a corresponding user mode setting item, and a user mode setting value in a valid case.

The user mode setting value in the valid case shows the user mode setting value that is set when the security policy setting value is valid.

The policy conversion module 204 converts the security policy setting value into the user mode setting value by searching the user mode setting items in the conversion rule file for the policy name as a conversion target. The character strings of the policy names are compared in the above-mentioned search. On the other hand, the security policy setting items corresponding to the policy names may be managed using numerals, such as IDs, and the numerals may be compared for searching.

The example shown in FIG. 3D shows that the security policy setting item of which the policy name is "Perform acquisition of audit log" corresponds to the user mode setting item of "Obtain audit log".

It is shown that the user mode setting value of the user mode setting item of "Obtain audit log" is turned "ON" by the policy conversion module 204 when the security policy setting value is valid.

Moreover, it is shown that the security policy setting item of which the policy name is "Password complexity policy" corresponds to the user mode setting items of "User authentication password policy" and "FTP print password policy".

One security policy setting item may correspond to two or more user mode setting items in this way.

In this case, when the policy conversion module 204 converts "Password complexity policy", the user mode setting items of both "User authentication password policy" and "FTP print password policy" are converted into settings determined by the security policy setting values.

It should be noted that "FTP print password policy" as an user mode setting item is a setting item for setting complexity of a FTP password that is set in the image processing apparatus 101 beforehand.

Moreover, "User authentication password policy" is a setting item for setting complexity of a password used in user authentication that is executed before a user uses a function of the image processing apparatus 101 through the UI operation unit 103.

Then, in the user mode setting items corresponding to the security policy setting items of which the policy name is "Password complexity policy", the security policy setting values of "One or more symbol is included", "Same character is not used 3 times continuously", and "User name is not used as password" are converted into the corresponding user mode setting values, respectively.

It is shown that the security policy setting item of which the policy name is "Prohibit transfer of received job" corresponds to a user mode setting item "transfer setting".

A conversion example by the policy conversion module 204 will be described. For example, "Perform acquisition of audit log" in the security policy data in FIG. 3A agrees with "Perform acquisition of audit log" in the conversion rule file.

Accordingly, the policy conversion module 204 converts the policy name of "Perform acquisition of audit log" into the name of "Obtain audit log" of the user mode setting item. Then, the security policy setting value of "Valid" is converted into the user mode setting value of "ON", and the converted user mode setting value is stored in the user mode storage module 201.

Although the security policy data, the security policy management data, and the conversion rule file are described in a tabular form, they may be described in other forms, such as XML.

As described above, the security policy data contains the security policy setting values corresponding to the user mode setting values that are set by a user, Then, the conversion table (conversion rule file) in which the user mode setting value, the security policy setting value corresponding to the user mode setting value, and the policy name are associated one another is stored in the storage unit 106. The security policy setting value corresponding to the user mode setting value is applied after being converted to the user mode setting value using the conversion table.

FIG. 4A and FIG. 4B are views showing screen examples displayed on the UI operation unit 103 of the image processing apparatus 101 shown in FIG. 1.

FIG. 4A is a view showing an example of a policy setting screen 501 displayed on the UI operation unit 103.

As shown in FIG. 4A, an administrator selects a desired policy version using a pull-down menu of "Policy version". The security policy setting items displayed on the policy setting screen 501 according to the selected policy version varies. FIG. 4A shows that the policy version "2.0" is selected.

Moreover, the administrator sets "Valid" or "Invalid" for the policy name of "Perform acquisition of audit log". FIG. 4A shows that "Valid" is set up.

Furthermore, the administrator independently sets "One or more symbol is included", "Same character is not used 3 times continuously", and "User name is not used as password" for the policy name of "Password complexity" using radio buttons. FIG. 4A shows that "Same character is not used 3 times continuously" is set up.

Moreover, the administrator sets "Valid" or "Invalid" for the policy name of "Prohibit transfer of received job". FIG. 4A shows that "Invalid" is set up.

When the above settings are finished and the administrator depresses an OK button 506 in the policy setting screen 501, the policy generation module 206 generates security policy data according to the setting contents.

In the policy setting screen 501 shown in FIG. 4A, the administrator selects a policy version first, the policy setting items according to the selected policy version are displayed, and the administrator sets up.

On the other hand, all the settable policy setting items may be displayed on the policy setting screen, and a policy version may be determined according to the security policy setting items that the administrator sets up.

For example, "Password complexity" and "Perform acquisition of audit log" are set as "Valid" in the policy setting screen 501. According to the security policy management data shown in FIG. 3B managed by the policy management module 207, since a policy version required to set up the security policy setting values of these two security policy setting items is "1.0", the policy version is determines as "1.0".

Moreover, if a corresponding policy version is displayed for each policy name in the policy setting screen 501, an administrator is able to check the difference among the policy items due to the version difference more simply.

FIG. 4B is a view showing an example of a policy setting screen 1201 displayed on the UI operation unit 103.

In this policy setting screen 1201, the policy version corresponding to each policy name is displayed together.

Specifically, the policy version corresponding to the policy name of "Perform acquisition of audit log" is displayed as "1.0" in this policy setting screen 1201. Moreover, the policy version corresponding to the policy name of "Prohibit transfer of received job" is displayed as "2.0".

When the corresponding policy versions are displayed, the administrator easily identifies which policy version should be selected to set up the desired security policy setting value of the security policy setting item.

Also in the policy setting screen 1201 shown in FIG. 4B, when the administrator depresses an OK button 1206, the policy generation module 206 generates security policy data according to the setting contents.

The above-mentioned policy setting screens 501 and 1201 are displayed when the policy set menu is selected after the administrator is authenticated using a user authentication function on a user authentication screen (not shown).

Next, methods that an administrator sets a security policy to the image processing apparatus 101 will be described.

There are two methods of setting a security policy setting value to the image processing apparatus 101. In one method, the administrator sets up using a screen displayed on the UI operation unit 103 of the image processing apparatus 101.

In the other method, the administrator generates security policy data with the server 121, and distributes the generated security policy data to the image processing apparatus 101. When receiving the security policy data, the image processing apparatus 101 sets up a security policy setting value according to the security policy data.

The method that the administrator sets up the security policy setting value using the screen displayed on the UI operation unit 103 of the image processing apparatus 101 will be described first.

Figure 5:
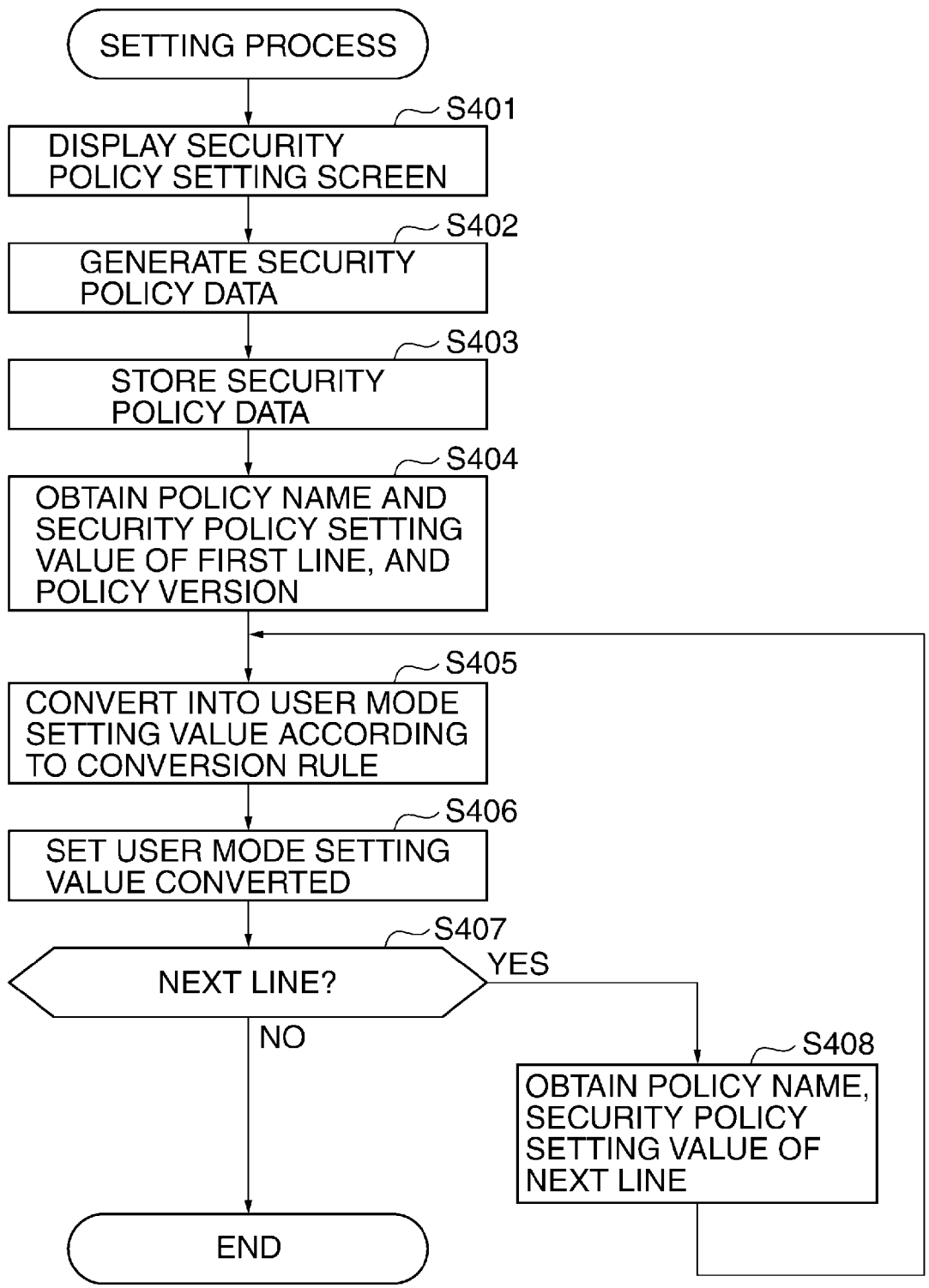
FIG. 5 is a flowchart showing procedures of a setting process executed by a CPU of the image processing apparatus shown in FIG. 1.

FIG. 5 is a flowchart showing procedures of a setting process executed by the CPU 104 of the image processing apparatus 101 shown in FIG. 1.

As shown in FIG. 5, the image processing apparatus 101 displays the policy setting screen 501 shown in FIG. 4A on the UI operation unit 103 in response to an instruction from the administrator (step S401).

Next, when the UI operation unit 103 receives depression of the OK button 506 on the policy setting screen 501, the policy generation module 206 generates the security policy data shown in FIG. 3A according to the contents set up on the policy setting screen 501 (step S402). This step S402 corresponds to an obtaining unit that obtains updating security policy data for updating the security policy data.

Then, the policy generation module 206 delivers the generated security policy data to the policy storage module 202, and the policy storage module 202 stores the delivered security policy data to the storage unit 106 (step S403).

Next, the policy conversion module 204 obtains a policy name and a security policy setting value of the first line and a policy version from the security policy data that is stored in the policy storage module 202 (step S404).

The policy name and the security policy setting value of the first line and the policy version obtained are stored into the RAM 105.

Next, the policy conversion module 204 obtains the conversion rule file shown in FIG. 3D stored by the conversion rule storage module 203, and converts the security policy setting values stored in the RAM 105 into the user mode setting values on the basis of the conversion rule (step S405).

Then, the policy conversion module 204 sets up the converted values as the user mode setting values of the user mode setting items (step S406), and makes the user mode storage module 201 store the user mode setting values and apply the security policy data. This step S406 corresponds to an application unit that applies the updating security policy data when it is determined that the updating security policy data will be applied.

Next, the policy conversion module 204 determines whether the next line exists in the security policy data (step S407). For example, when the policy name of the target of the process to the step S406 is "Password complexity policy" in the case of the security policy data shown in FIG. 3A, the policy name of the next line will be "Prohibit transfer of received job".

As a result of the determination in the step S407, when the next line exists in the security policy data (YES in the step S407), the policy conversion module 204 obtains a policy name and a security policy setting value of the next line of the security policy data (step S408), stores them to the RAM 105, and returns the process to the step S405.

On the other hand, as a result of the determination in the step S407, when the next line does not exist in the security policy data (NO in the step S407), this process is finished because all the policy names and security policy setting values included in the security policy data have been set.

Next, the method that the administrator generates security policy data with the server 121, and distributes the generated security policy data to the image processing apparatus 101 will be described.

The administrator first sets up the policy version and the security policy setting values that are managed by the policy management module 212 of the server 121 as with the setting in the image processing apparatus 101.

Here, a policy setting screen that is similar to the policy setting screen 501 shown in FIG. 4A displayed on the UI operation unit 103 of the image processing apparatus 101 is displayed on the input unit 126. When the input unit 126 receives depression of an OK button on the policy setting screen, the policy generation module 210 generates the security policy data according to the contents set up on the policy setting screen, and stores it into the storage unit 125. The security policy data shown in FIG. 3A shall be generated, for example.

Next, when receiving an instruction to distribute the security policy data by the administrator, the input unit 126 instructs the policy transmitting module 211 to distribute the security policy data. When receiving the instruction, the policy transmitting module 211 distributes the security policy data stored in the storage unit 125 from the network communication unit 124 to the network communication unit 102 of the image processing apparatus 101 through the network 131.

This security policy data may be automatically distributed from the server 121. When the security policy data is distributed, it is preferable to authenticate an administrator and a specific computer that sends the data. However, a description about the authentication method is omitted in this embodiment.

Figure 6:
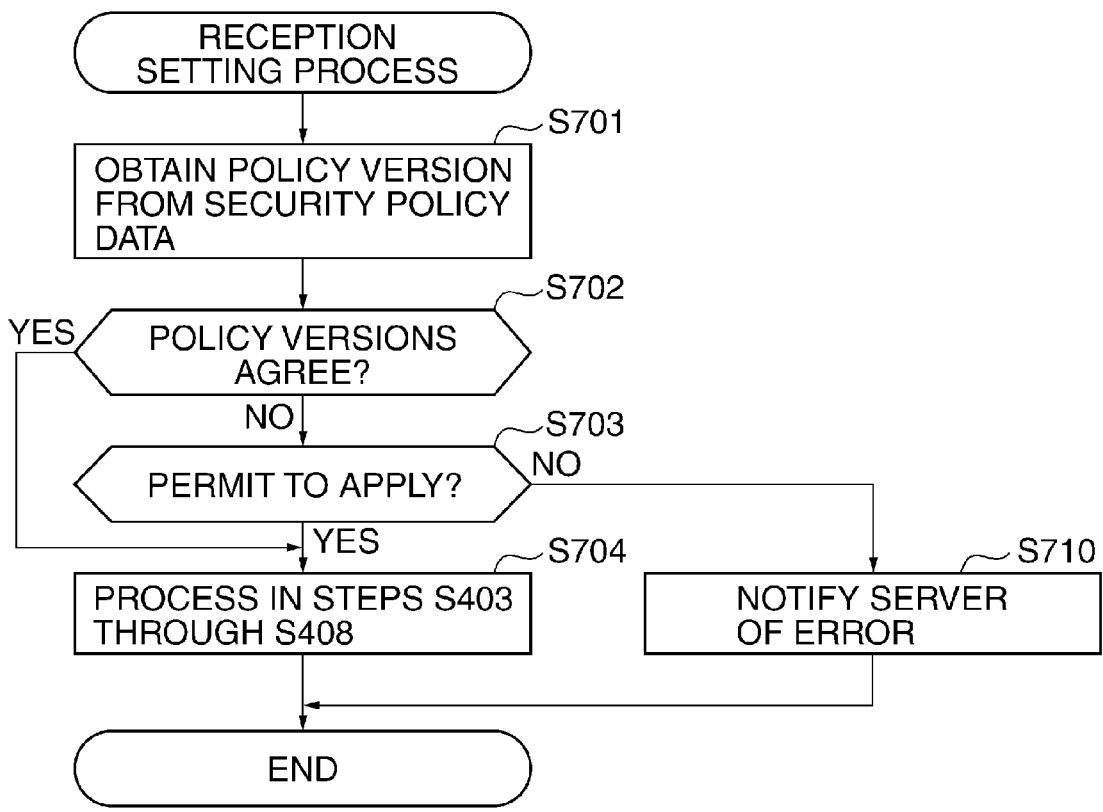
FIG. 6 is a flowchart showing procedures of a reception setting process executed by the CPU of the image processing apparatus shown in FIG. 1.

FIG. 6 is a flowchart showing procedures of a reception setting process executed by the CPU 104 of the image processing apparatus 101 shown in FIG. 1.

As shown in FIG. 6, when the network communication unit 102 receives the security policy data from the server 121, the policy receiving module 205 receives the security policy data. Then, the policy receiving module 205 analyzes the received security policy data and obtains the policy version (step S701). This step S701 corresponds to the obtaining unit that obtains updating security policy data for updating the security policy data.

Next, it is determined whether the policy version of the received security policy data agrees with the policy version applied to the image processing apparatus 101 (step S702).

For example, the policy version stored in the policy storage module 202 shall be "2.0". In such a case, when the version of the received security policy data is "2.0", it is determined that the versions agree. When the version of the received security policy data is "1.0", it is determined that the versions do not agree.

As a result of the determination in the step S702, when it is determined that the policy versions agree (YES in the step S702), the process in the steps S403 through S408 in FIG. 5 (step S704) is performed, and this process is finished.

On the other hand, as a result of the determination in the step S702, when it is determined that the policy versions do not agree (NO in the step S702), the policy receiving module 205 determines whether an application of the security policy data is allowed (step S703). The step S703 corresponds to an application version determination unit that determines whether the updating security policy data will be applied according to a predetermined application version setting value, when a version of the obtained updating security policy data differs from the version of the security policy data that is being applied actually.

As mentioned above, since the policy setting storage module 208 stores the application version setting value that shows whether setting of a setting item of a policy version that differs from the policy version applied to the image processing apparatus 101 is permitted, the policy receiving module 205 determines by using this.

As a result of the determination in the step S703, when the application is permitted (YES in the step S703), the process proceeds to the above-mentioned step S704.

On the other hand, as a result of the determination in the step S703, when the application is not permitted (NO in the step S703), the received security policy data is not applied to the image processing apparatus 101, the server 121 is notified of an error (step S710), and this process is finished. Thus, when the obtained security policy data is not applied, the server 121 is notified of an error in the embodiment.

As mentioned above, since the security policy data distributed from the server is applied only when the policy version of the distributed security policy data agree with the policy version managed by the image processing apparatus 101, an erroneous change of the policy version is prevented.

Moreover, when the server 121 manages a plurality of image processing apparatuses of which policy versions differ, the administrator is easily notified that different policy versions are applied to the respective image processing apparatuses.

Next, a process that controls application of the distributed security policy data will be described.

Figures 7A, 7B:
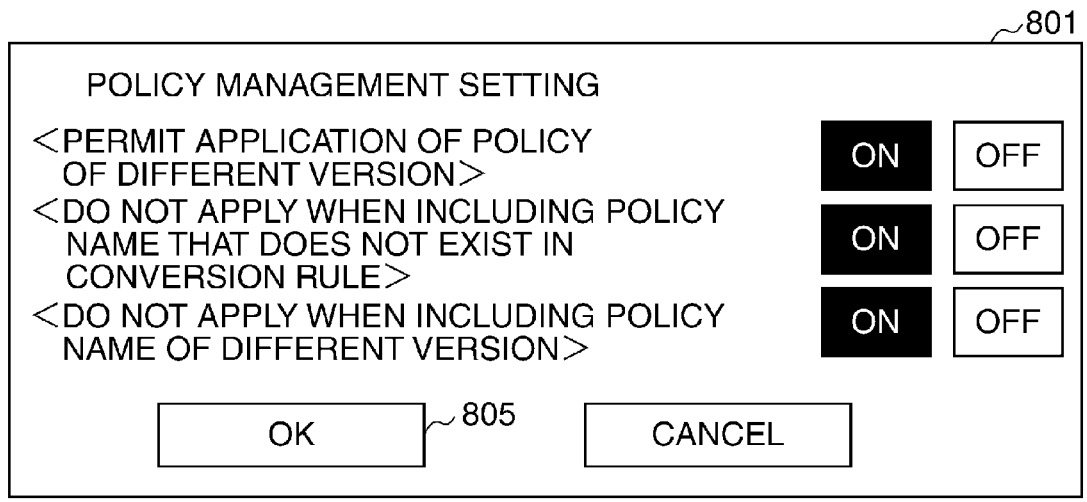

FIG. 7A is a view showing an example of a policy management setting screen displayed on the UI operation unit 103 of the image processing apparatus 101 in FIG. 1. FIG. 7B, FIG. 7C, and FIG. 7D are views showing examples of the security policy data applied to the image processing apparatus 101.

In the policy management setting screen 801 in FIG. 7A, items of "Permit application of policy of different version", "Do not apply when including policy name that does not exist in conversion rule", and "Do not apply when including policy name of different version" are settable. Each of these items is settable by ON or OFF.

Among these, when the item of "Permit application of policy of different version" is ON, setting of a setting item of a policy version that differs from the policy version applied to the image processing apparatus 101 is permitted in the step S703.

The following item of "Do not apply when including policy name that does not exist in conversion rule" shows whether the security policy setting value of the policy name that does not exist in the conversion rule file among the policy names included in the security policy data set up by the administrator or the security policy data distributed from the server 121 is applied.

Specifically, the security policy data in FIG. 7B shall be applied to the image processing apparatus 101. Then, the security policy data in FIG. 7C shall be set up by the administrator, or it shall be distributed from the server 121. Furthermore, the conversion rule file in FIG. 3D shall be used.

Although the policy name of "Eliminate residual data" exists in FIG. 7C, this policy name does not exist in the conversion rule file in FIG. 3D. Accordingly, when the item of "Do not apply when including policy name that does not exist in conversion rule" is ON, setting of the security policy setting value of which the policy name does not exist is not permitted.

The following item of "Do not apply when including policy name of different version" shows whether the security policy setting value of which the policy name does not agree with the policy version applied to the image processing apparatus among the security policy data set by the administrator or the policy names contained in the security policy data distributed from the server 121 is applied.

Specifically, the policy name of "Prohibit transfer of received job" exists in FIG. 7C and FIG. 7D. And also the policy name exists in the conversion rule file in FIG. 3D. However, the policy versions of the security policy data in FIG. 7C and FIG. 7D are "3.0".

When the item of "Do not apply when including policy name of different version" is ON, setting of the security policy setting value of the security policy setting item of the policy name of which the version does not agree is not permitted.

When the administrator sets up ON or OFF for the above-mentioned three items and depresses the OK button 805, the policy setting storage module 208 stores the setting values into the storage unit 106. The setting value of "Permit application of policy of different version" is stored as the application version setting value. The setting value of "Do not apply when including policy name that does not exist in conversion rule" is stored as an absence name setting value. The setting value of "Do not apply when including policy name of different version" is stored as a name version setting value.

As described above, the predetermined user is able to set up the application version setting value, the absence name setting value, and the name version setting value in this embodiment. The predetermined user is the administrator in this embodiment.

The setting value may be stored to the security policy data, and may be set up with the security policy setting item. Moreover, the setting value may be received from an external device, such as a PC 111, by the network communication unit 102, and it may be stored by the policy setting storage module 208.

A process performed according to the setting contents about the respective items will be described using a flowchart.

Figure 8:
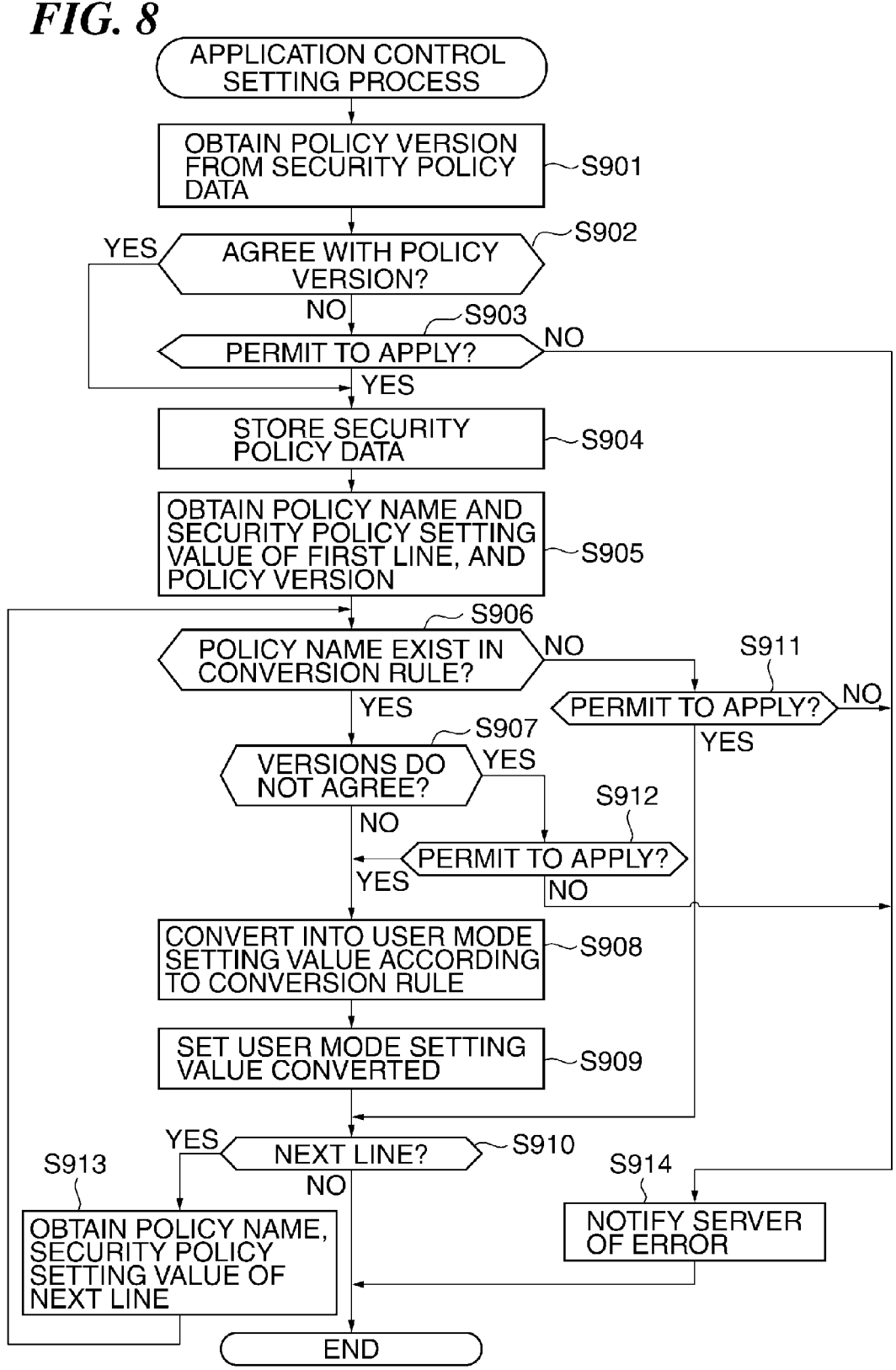
FIG. 8 is a flowchart showing procedures of an application control setting process executed by the CPU of the image processing apparatus shown in FIG. 1.

FIG. 8 is a flowchart showing procedures of an application control setting process executed by the 101 of the image processing apparatus shown in FIG. 1.

As shown in FIG. 8, the process in steps S901 through S903 is the same as the process in the steps S701 through S703 in FIG. 6. Moreover, the steps S904 and S905 are identical to the steps S403 and S405 in FIG. 5. Accordingly, the process from step S906 will be described.

The policy conversion module 204 obtains the conversion rule file stored in the conversion rule storage module 203. Then, it is determined whether the policy name of the security policy data stored in the RAM 105 exists in the conversion rule (step S906). The contents of the process were described with reference to FIG. 7A through FIG. 7D.

As a result of the determination in the step S906, when the policy name does not exist in the conversion rule (NO in the step S906), it is determined whether application of the security policy data is permitted (step S911). This is determined by the absence name setting value of the item of "Do not apply when including policy name that does not exist in conversion rule" in the policy management setting screen 801 in FIG. 7A.

When the item of "Do not apply when including policy name that does not exist in conversion rule" is set to ON, the application is not permitted. When the item is set to OFF, the application is permitted.

The above-mentioned step S911 corresponds to an absence name determination unit that determines whether the updating security policy data will be applied according to a predetermined absence name setting value when the policy name contained in the updating security policy data does not exist in the conversion table.

As a result of the determination in the step S911, when the application is not permitted (NO in the step S911), the received security policy data is not applied to the image processing apparatus 101, the server 121 is notified of an error (step S914), and this process is finished. Thus, the updating security policy data other than that of which the policy name does not exist is applied.

On the other hand, as a result of the determination in the step S911, when the application is permitted (YES in the step S911), the current line is skipped, and the policy conversion module 204 determines whether the next line exists in the security policy data (step S910).

As a result of the determination in the step S910, when the next line exists in the security policy data (YES in the step S910), the policy conversion module 204 obtains a policy name and a security policy setting value of the next line of the security policy data (step S913), stores them to the RAM 105, and returns the process to the step S906.

On the other hand, as a result of the determination in the step S910, when the next line does not exist in the security policy data (NO in the step S910), this process is finished because all the policy names and security policy setting values included in the security policy data have been set.

Returning to the step S906, as a result of the determination in the step S906, when the policy name exists in the conversion rule (YES in the step S906), it is determined whether a policy name of which the version does not agree is contained (step S907). The contents of the process were described with reference to FIG. 7A through FIG. 7D.

As a result of the determination in the step S907, when it is determined that a policy name of which the version does not agree is not contained (NO in the step S907), the process proceeds to step S908 mentioned later.

On the other hand, as a result of the determination in the step S907, when it is determined that a policy name of which the versions do not agree is contained (YES in the step S907), it is determined whether application of the security policy data is permitted (step S912). This is determined by the name version setting value of the item of "Do not apply when including policy name of different version" in the policy management setting screen 801 in FIG. 7A.

When the item of "Do not apply when including policy name of different version" is set to ON, the application is not permitted. When the item is set to OFF, the application is permitted. This step S912 corresponds to a name version determination unit that determines whether the updating security policy data will be applied according to a predetermined name version setting value when the policy name contained in the updating security policy data exists in the conversion table and when a version of the updating security policy data differs from a version of security policy data that is being applied actually, As a result of the determination in the step S912, when the application is not permitted (NO in the step S912), the received security policy data is not applied to the image processing apparatus 101, the server 121 is notified of an error (step S914), and this process is finished.

On the other hand, as a result of the determination in the step S912, when the application is permitted (YES in the step S912), the policy conversion module 204 obtains the conversion rule file shown in FIG. 3D stored by the conversion rule storage module 203, and converts the security policy setting values stored in the RAM 105 into the user mode setting values on the basis of the conversion rule (step S908).

Then, the policy conversion module 204 sets up the converted values as the user mode setting values of the user mode setting items (step S909), and makes the user mode storage module 201 store the user mode setting values.

Next, the policy conversion module 204 determines whether the next line exists in the security policy data (step S910).

As a result of the determination in the step S910, when the next line exists in the security policy data (YES in the step S910), the policy conversion module 204 obtains a policy name and security policy setting values of security policy data of the next line (step S913), stores it to the RAM 105, and returns the process to the step S906.

On the other hand, as a result of the determination in the step S910, when the next line does not exist in the security policy data (NO in the step S910), this process is finished because all the policy names and security policy setting values included in the security policy data have been set.

According to the application control setting process in FIG. 8, the administrator is able to set in detail about whether the security policy data distributed from the server 121 or set by the administrator is applied or not. Accordingly, when the image processing apparatuses of which the policy versions differ due to change of the operational environment are intermingled, an erroneous change of an unintentional policy item is prevented.

Next, a method of determining whether security policy data is applicable by checking contents of policy items included in the security policy data when the security policy data of a different version is received will be described.

Figure 9:
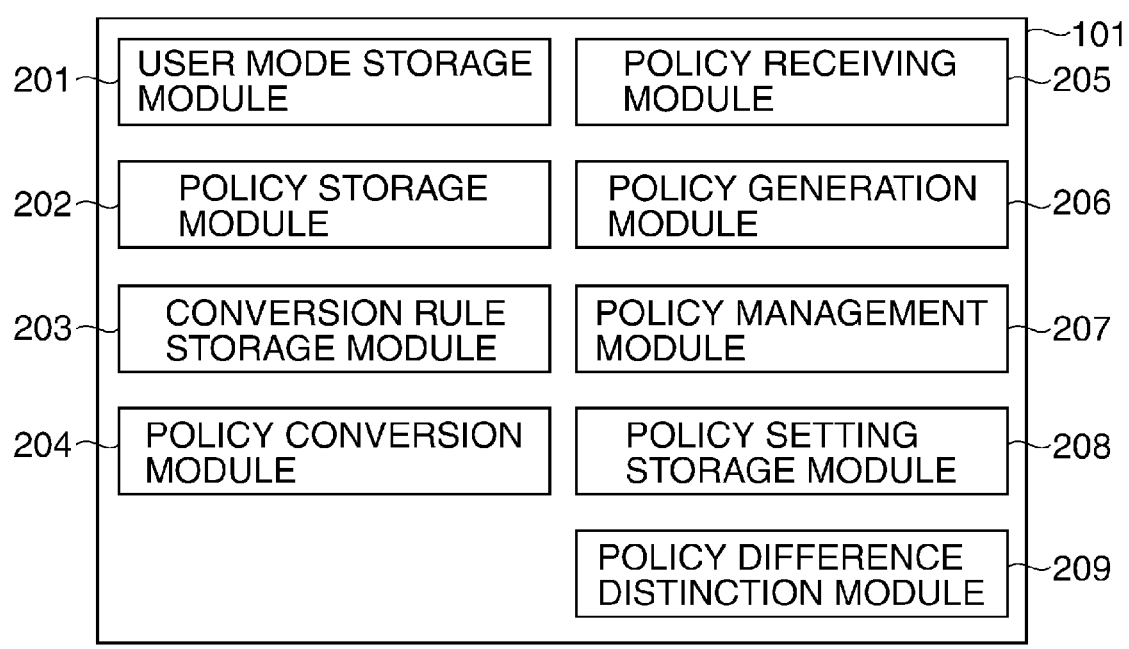
FIG. 9 is a view showing a configuration in which a policy difference distinction module is added to the software configuration of the image processing apparatus shown in FIG. 1.

FIG. 9 is a view showing a configuration in which a policy difference distinction module 209 is added to the software configuration of the image processing apparatus 101 shown in FIG. 1.

The configuration shown in FIG. 9 is configured by adding the policy difference distinction module 209 to the configuration shown in FIG. 2.

This policy difference distinction module 209 checks an applicable security policy setting item according to a policy version, and determines whether security policy data is applicable.

Specifically, the policy difference distinction module 209 determines whether application is permitted as with the step S703 in FIG. 6.

In the step S703, the policy difference distinction module 209 checks the received security policy data. And when all the security policy setting items as differences are set to "Invalid", the application of the security policy data is permitted even if the policy version is different.

For example, the security policy data shown in FIG. 7B shall be applied to the image processing apparatus 101, and the security policy data shown in FIG. 7D shall be received from the server 121.

The policy version of the security policy data of the image processing apparatus 101 is "1.0", and differs from the policy version "3.0" of the received security policy data.

The differences between the policy versions "3.0" and "1.0" are "Prohibit transfer of received job" and "Eliminate residual data".

Then, the security policy setting values of both the items of "Prohibit transfer of received job" and "Eliminate residual data" in the received security policy data are "Invalid".

In such a case, the policy difference distinction module 209 permits application of the security policy data in the step S703.

On the other hand, when the security policy data shown in FIG. 7C is received, the security policy setting value of the item of "Eliminate residual data" as a difference is "Valid", and accordingly, the policy difference distinction module 209 does not permit application of the policy.

As described above, according to the embodiment, the updating security policy data is applied, when a version of the updating security policy data differs from a version of security policy data that is being applied actually, and when a security policy setting value corresponding to a policy name that is not contained in the security policy data that is being applied actually among the policy names contained in the updating security policy data shows that the security policy of the policy name concerned will not be applied (invalid).

According to the policy difference distinction module 209, only when the security policy setting value of the security policy setting item as a difference is "invalid", a security policy data is applied. Accordingly, necessary security policy data is applied while an administrator is unconscious of a version difference.

According to the embodiment described above, when the version of the updating security policy data differs from the version of the security policy data that is being applied actually, it is determined whether the updating security policy data is applied according to the predetermined application version setting value (the step S703). Since the updating security policy data is applied (the step S406) when it is determined that the updating security policy data is applied (YES in the step S703), it becomes possible to apply appropriately the security policy data according to the information security policy.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-206276, filed Oct. 1, 2013, which is hereby incorporated by reference herein in its entirety.

What is claimed is:

1. An image processing apparatus to which security policy data containing a policy name of a security policy and a security policy setting value corresponding to the policy name is applied, comprising:
   a storage unit configured to store instructions; and
   a processor operable when executing the instructions to:
      obtain updating security policy data for updating the security policy data,
      determine whether the updating security policy data will be applied according to a predetermined application version setting value, when a version of the updating security policy data differs from a version of security policy data that is being applied actually, and
      apply the updating security policy data when the it is determined that the updating security policy data will be applied,
   wherein the security policy data contains a security policy setting value corresponding to a user mode setting value that is set by a user,
   wherein the storage unit stores a conversion table in which the user mode setting value, the security policy setting value corresponding to the user mode setting value, and the policy name are associated one another, and
   wherein the security policy setting value corresponding to the user mode setting value is applied after being converted to the user mode setting value using the conversion table.

2. The image processing apparatus according to claim 1, wherein the processor is further operable to execute the instructions to determine whether the updating security policy data will be applied according to a predetermined absence name setting value, when the policy name contained in the updating security policy data does not exist in the conversion table,
   wherein the updating security policy data other than the not-existing policy name is applied when it is determined that the updating security policy data will be applied.

3. The image processing apparatus according to claim 2, wherein the processor is further operable to execute the instructions to determine whether the updating security policy data will be applied according to a predetermined name version setting value, when the policy name contained in the updating security policy data exists in the conversion table and when the version of the updating security policy data differs from the version of the security policy data that is being applied actually, and
   wherein the updating security policy data is applied when it is determined that the updating security policy data will be applied.

4. The image processing apparatus according to claim 3, wherein a predetermined user is able to set up the application version setting value, the absence name setting value, and the name version setting value.

5. A control method for an image processing apparatus to which security policy data containing a policy name of a security policy and a security policy setting value corresponding to the policy name is applied, the control method comprising:
   an obtaining step of obtaining updating security policy data for updating the security policy data;
   an application version determination step of determining whether the updating security policy data obtained in the obtaining step will be applied according to a predetermined application version setting value, when a version of the updating security policy data differs from a version of security policy data that is being applied actually; and
   an application step of applying the updating security policy data when it is determined that the updating security policy data will be applied in the application version determination step,
   wherein the security policy data contains a security policy setting value corresponding to a user mode setting value that is set by a user,
   wherein a conversion table in which the user mode setting value, the security policy setting value corresponding to the user mode setting value, and the policy name are associated one another is stored in a storage unit,
   wherein the security policy setting value corresponding to the user mode setting value is applied after being converted to the user mode setting value using the conversion table, and
   wherein at least one of the obtaining step, the application version determination step, or the application step is implemented by a processor.

6. The control method according to claim 5, further comprising an absence name determination step of determining whether the updating security policy data will be applied according to a predetermined absence name setting value, when the policy name contained in the updating security policy data does not exist in the conversion table,
   wherein the updating security policy data other than the not-existing policy name is applied in the application step, when it is determined that the updating security policy data will be applied in the absence name determination step.

7. The control method according to claim 6, further comprising a name version determination step of determining whether the updating security policy data will be applied according to a predetermined name version setting value, when the policy name contained in the updating security policy data exists in the conversion table and when the version of the updating security policy data differs from the version of the security policy data that is being applied actually,
  wherein the updating security policy data is applied in the application step when it is determined that the updating security policy data will be applied in the name version determination step.

8. The control method according to claim 7, wherein a predetermined user is able to set up the application version setting value, the absence name setting value, and the name version setting value.

9. A non-transitory computer-readable storage medium storing instructions that, when executed by a processor, cause the processor to implement a control method for an image processing apparatus to which security policy data containing a policy name of a security policy and a security policy setting value corresponding to the policy name is applied, the control method comprising:
  an obtaining step of obtaining updating security policy data for updating the security policy data;
  an application version determination step of determining whether the updating security policy data obtained in the obtaining step will be applied according to a predetermined application version value, when the version of the updating security policy data differs from the version of the security policy data that is being applied actually; and
  an application step of applying the updating security policy data when it is determined that the updating security policy data will be applied in the application version determination step,
  wherein the security policy data contains a security policy setting value corresponding to a user mode setting value that is set by a user,
  wherein a conversion table in which the user mode setting value, the security policy setting value corresponding to the user mode setting value, and the policy name are associated one another is stored in a storage unit, and
  wherein the security policy setting value corresponding to the user mode setting value is applied after being converted to the user mode setting value using the conversion table.

10. The non-transitory computer-readable storage medium according to claim 9, wherein the control method further comprises an absence name determination step of determining whether the updating security policy data will be applied according to a predetermined absence name setting value, when the policy name contained in the updating security policy data does not exist in the conversion table, and
  wherein the updating security policy data other than the not-existing policy name is applied in the application step, when it is determined that the updating security policy data will be applied in the absence name determination step.

11. The non-transitory computer-readable storage medium according to claim 10, wherein the control method further comprises a name version determination step of determining whether the updating security policy data will be applied according to a predetermined name version setting value, when the policy name contained in the updating security policy data exists in the conversion table and when the version of the updating security policy data differs from the version of the security policy data that is being applied actually, and
  wherein the updating security policy data is applied in the application step when it is determined that the updating security policy data will be applied in the name version determination step.

12. The non-transitory computer-readable storage medium according to claim 11, wherein a predetermined user is able to set up the application version setting value, the absence name setting value, and the name version setting value.

13. An image processing apparatus to which security policy data containing a policy name of a security policy and a security policy setting value corresponding to the policy name is applied, comprising:
  a memory configured to store instructions; and
  a processor operable when executing the instructions stored in the memory to:
    obtain updating security policy data for updating the security policy data;
    determine whether the updating security policy data will be applied according to a predetermined application version setting value, when a version of the updating security policy data differs from a version of security policy data that is being applied actually; and
    apply the updating security policy data when it is determined that the updating security policy data will be applied,
  wherein the updating security policy data is applied, when the version of the updating security policy data differs from the version of the security policy data that is being applied actually and when a security policy setting value corresponding to a policy name that is not contained in the security policy data that is being applied actually among the policy names contained in the updating security policy data shows that the security policy of the policy name concerned will not be applied.

14. A control method for an image processing apparatus to which security policy data containing a policy name of a security policy and a security policy setting value corresponding to the policy name is applied, the control method comprising:
  an obtaining step of obtaining updating security policy data for updating the security policy data;
  an application version determination step of determining whether the updating security policy data obtained in the obtaining step will be applied according to a predetermined application version setting value, when a version of the updating security policy data differs from a version of security policy data that is being applied actually; and
  an application step of applying the updating security policy data when it is determined that the updating security policy data will be applied in the application version determination step,
  wherein the updating security policy data is applied in the application step when the version of the updating security policy data differs from the version of the security policy data that is being applied actually and when a security policy setting value corresponding to a policy name that is not contained in the security policy data that is being applied actually among the policy names contained in the updating security policy data shows that the security policy of the policy name concerned will not be applied, and
  wherein at least one of the obtaining step, the application version determination step, or the application step is implemented by a processor.

15. A non-transitory computer-readable storage medium storing instructions that, when executed by a processor, cause the processor to implement a control method for an image processing apparatus to which security policy data containing a policy name of a security policy and a security policy setting value corresponding to the policy name is applied, the control method comprising:
- an obtaining step of obtaining updating security policy data for updating the security policy data;
- an application version determination step of determining whether the updating security policy data obtained in the obtaining step will be applied according to a predetermined application version value, when the version of the updating security policy data differs from the version of the security policy data that is being applied actually; and
- an application step of applying the updating security policy data when it is determined that the updating security policy data will be applied in the application version determination step,
- wherein the updating security policy data is applied in the application step, when the version of the updating security policy data differs from the version of the security policy data that is being applied actually and when a security policy setting value corresponding to a policy name that is not contained in the security policy data that is being applied actually among the policy names contained in the updating security policy data shows that the security policy of the policy name concerned will not be applied.

16. An image processing apparatus to which security policy data containing a policy name of a security policy and a security policy setting value corresponding to the policy name is applied, comprising:
- a memory configured to store instructions; and
- a processor operable when executing the instructions stored in the memory to:
  - obtain updating security policy data for updating the security policy data;
  - determine whether the updating security policy data will be applied according to a predetermined application version setting value, when a version of the updating security policy data differs from a version of security policy data that is being applied actually; and
  - apply the updating security policy data when it is determined that the updating security policy data will be applied,
- wherein an error showing not to apply is informed to a server that distributes the security policy data, when the security policy data that was obtained from the server is not applied.

17. A control method for an image processing apparatus to which security policy data containing a policy name of a security policy and a security policy setting value corresponding to the policy name is applied, the control method comprising:
- an obtaining step of obtaining updating security policy data for updating the security policy data;
- an application version determination step of determining whether the updating security policy data obtained in the obtaining step will be applied according to a predetermined application version setting value, when a version of the updating security policy data differs from a version of security policy data that is being applied actually; and
- an application step of applying the updating security policy data when it is determined that the updating security policy data will be applied in the application version determination step,
- wherein an error showing not to apply is informed to a server that distributes the security policy data, when the security policy data that was obtained from the server in the obtaining step is not applied, and
- wherein at least one of the obtaining step, the application version determination step, or the application step is implemented by a processor.

18. A non-transitory computer-readable storage medium storing instructions that, when executed by a processor, cause the processor to implement a control method for an image processing apparatus to which security policy data containing a policy name of a security policy and a security policy setting value corresponding to the policy name is applied, the control method comprising:
- an obtaining step of obtaining updating security policy data for updating the security policy data;
- an application version determination step of determining whether the updating security policy data obtained in the obtaining step will be applied according to a predetermined application version value, when the version of the updating security policy data differs from the version of the security policy data that is being applied actually; and
- an application step of applying the updating security policy data when it is determined that the updating security policy data will be applied in the application version determination step,
- wherein an error showing not to apply is informed to a server that distributes the security policy data, when the security policy data that was obtained from the server in the obtaining step is not applied.

* * * * *